United States Patent [19]
Ishikawa et al.

[11] Patent Number: 5,333,280
[45] Date of Patent: Jul. 26, 1994

[54] PARALLEL PIPELINED INSTRUCTION PROCESSING SYSTEM FOR VERY LONG INSTRUCTION WORD

[75] Inventors: Isako Ishikawa; Yumiko Ushimaru, both of Tokyo, Japan

[73] Assignee: NEC Corporation, Tokyo, Japan

[21] Appl. No.: 682,085

[22] Filed: Apr. 8, 1991

[30] Foreign Application Priority Data

Apr. 6, 1990 [JP] Japan ................................. 2-91581
Apr. 10, 1990 [JP] Japan ................................. 2-94507

[51] Int. Cl.$^5$ ........................... G06F 9/38; G06F 7/00
[52] U.S. Cl. .................................... 395/375; 395/800
[58] Field of Search ................................ 395/375, 800

[56] References Cited

U.S. PATENT DOCUMENTS

| | | | |
|---|---|---|---|
| 4,334,268 | 6/1982 | Boney et al. | 395/375 |
| 4,539,635 | 9/1985 | Boddie et al. | 395/775 |
| 4,777,587 | 10/1988 | Case et al. | 395/375 |
| 4,977,496 | 12/1990 | Onishi et al. | 395/375 |
| 5,099,419 | 3/1992 | Nomura | 395/375 |
| 5,142,630 | 8/1992 | Ishikawa | 395/375 |

FOREIGN PATENT DOCUMENTS

0021399A1 1/1981 European Pat. Off. .
6227275 8/1988 Japan .

OTHER PUBLICATIONS

J. R. Brown et al., "Conditionally Executable Instructions"; IBM Technical Disclosure Bulletin, vol. 14, No. 7, Dec. 1971, p. 2109.
Colwell et al., "A VLIW Architecture for a Trace ... " IEEE, vol. 37, No. 8, Aug. 1988.
Steven, G. B. et al., "Harp: A Parallel Pipelined Risc Processor" Microprocessors and Microsystems Butterworth & Co. Publishers Ltd. Nov. 1989.

Primary Examiner—Parshotam S. Lall
Assistant Examiner—Viet Vu
Attorney, Agent, or Firm—Whitham, Curtis & Whitham

[57] ABSTRACT

A parallel pipelined instruction processing system for executing a plurality of instructions in parallel without no branch delay, comprises a instruction block fetch unit for fetching an instruction block including at least one instruction field and one branch instruction field, at least one instruction execution unit receiving an instruction included in the instruction field of the instruction block held in the instruction block fetch unit and for executing the received instruction, and a branch instruction execution unit receiving a branch instruction included in the branch instruction field of the instruction block held in the instruction block fetch unit and for executing a processing for the received branch instruction. The branch instruction execution unit includes an operand fetch circuit receiving the branch instruction included in the branch instruction field of the fetched instruction block for fetching, from a data register group, an operand to be used for the received branch instruction, and an address generation circuit receiving the branch instruction included in the branch instruction field of the fetched instruction block and for simultaneously generating a next address of an instruction to be next fetched and a branch destination address for the received branch instruction. The address generation circuit operates to output one of the next address and the branch destination address on the basis of the content of the operand fetch circuit.

3 Claims, 10 Drawing Sheets

FIELD 1: lsl r22,#1,r22
FIELD 2: +add r3,r22,r3
FIELD 3: lsl r21,r25,r23
FIELD 4: bf r23, A

FIGURE 8

| 31   26 | 25   21 | 20   16 | 15   11 | 10   2 | 0 BIT |
|---------|---------|---------|---------|--------|-------|
| add | r3 | r22 | r3 | — | + |
| OP CODE | SOURCE REGISTER 1 | SOURCE REGISTER 2 | DESTINATION REGISTER | | INSTRUCTION EXECUTION SELECTION FIELD |

PARALLEL PIPELINED INSTRUCTION PROCESSING SYSTEM FOR VERY LONG INSTRUCTION WORD

BACKGROUND OF THE INVENTION

1. Field of the Invention

The present invention relates to a data processing system, and more specifically to a pipelined instruction processing system having a plurality of instruction processing units located in parallel for executing a plurality of instructions in parallel and each having a pipelined mechanism for high speed data processing.

2. Description of Related Art

In order to elevate performance of a computer system, a parallel pipelined instruction processing system combining instruction pipelined processing and a VLIW (very long instruction word) type parallel instruction processing has been known.

The VLIW type parallel instruction processing is such that a relatively long instruction including a plurality of instruction fields (called an "instruction block" hereinafter) is processed as one instruction. A VLIW type parallel computer system treats each instruction block by dividing the instruction block into a plurality of fields and by processing the plurality of fields in parallel to each other by independently controlling a number of operation units, registers, interconnecting networks, memories and others.

In brief, at the time of compiling, a plurality of instructions which can be processed in parallel are extracted from a source program, and then, combined to form one instruction block. Therefore, if the degree of parallelism near to the number of parallel processing units can be obtained, high speed processing can be attained. However, if the degree of parallelism is low, an empty instruction field or empty instruction fields occur, with the result that the processing performance is decreased. In fact, to what extent the instructions fields can be filled is dependent upon the capability of the compiler and the source program.

In the VLIW system, however, since parallelization of instructions is executed at time of the compiling, it is not necessary to carry out a complicated processing such as detection of mutual dependence between items of data. Therefore, the hardware can be simplified.

This VLIW system can be said to be based on an idea originating from a horizontal microinstruction system, and to be suitable for an elaborate parallel processing using a plurality of processing units having a low degree of function (low level parallel processing).

In general, a process of executing a machine instruction in the computer system is achieved by sequentially performing an instruction fetching (abbreviated as "IF" in the specification and in the accompanying drawings), an instruction decoding (abbreviated as "ID"), an operand address generation (abbreviated as "AG"), an operand fetching (abbreviated as "OF"), execution of operation (abbreviated as "EX"), and a writing back of the result of the execution of operation (abbreviated as "WB") in the named order. The instruction pipelined processing is realized by dividing the above mentioned processing into a plurality of processing stages, providing individual hardwares corresponding to each of the processing stages, and causing each individual processing hardware to execute its assigned processing in parallel to execution of the other processing hardwares.

As seen from the above, in the instruction pipelined system, the respective processing stages operate in overlay with each other. Therefore, if an execution time of each processing stage is the same and if a machine cycle of each processing stage is the same, the instruction pipelined system can exhibit its maximum performance, and the result of the operation can be obtained at every machine cycle.

At present, it has been considered that a flow of the instruction pipelined processing is disturbed:

(a) when a succeeding instruction requires the result of execution of a preceding instruction;

(b) when a preceding instruction determines an operand address for a succeeding instruction;

(c) when a branch is generated;

(d) when memory accesses conflict with each other;

(e) when a preceding instruction rewrites a content of a succeeding instruction;

(f) when an interrupt or a branch occurs;

(g) when an instruction is so complicated as to need a plurality of machine cycle for execution of a required operation.

In order to suppress the above mentioned factors disturbing the instruction pipelined processing, various improvements have been attempted. For example, in order to suppress disturbance of the pipelined processing caused by a conditional branch, there have been proposed a loop buffer system using a large instruction buffer capable of storing a program loop, a plural instruction flow system processing an instruction stream when a condition for the conditional branch is satisfied and another instruction stream when the condition for the conditional branch is not satisfied, and a branch estimation system estimating a branch on the basis of a history of branch instructions.

In any case, in the pipelined processing, whether or not a branch condition for a conditional branch instruction is satisfied, cannot be known unless the processing reaches a later stage of the pipelined processing. If the branch condition is satisfied, it is necessary to invalidate instructions already fetched in the instruction pipelined system, and to fetch a flow of instructions starting from a branch destination instruction. In other words, at least one empty machine cycle is generated. Accordingly, when the branch condition is satisfied and the branch is executed, the instruction pipelined processing is delayed and the overall processing capacity is decreased.

In order to minimize this decrease of performance, a delayed branch mechanism has been used. This delayed branch mechanism is such that a branch instruction is deemed to be a delayed typed instruction which is executed at a time later than issuance of the branch instruction by one machine cycle, and an instruction slot immediately after the branch instruction is filled with an valid instruction by means of an instruction scheduling performed by a compiler, so that the disturbance of the pipelined processing is avoided so as to prevent the decrease of the performance.

However, if the instruction slot immediately after the branch instruction was not filled with an valid instruction, it is necessary to fill a NOP (no-operation) instruction into the instruction slot immediately after the branch instruction. In this case, of course, the performance is decreased.

To what degree the delayed instruction slots can be filled with valid instructions, is dependent upon a performance of the compiler. At present, it has become possible to effectively utilize about 80% to 90% of the delayed instruction slots by using a recent compiler technique.

The above mentioned VLIW type parallel instruction processing and the above mentioned instruction pipelined processing are combined to form a parallel pipelined instruction processing system.

In this parallel pipelined instruction processing system, a field exclusively used for a branch instruction is provided in an instruction format, and a branch instruction processing unit is provided separately from other instruction processing units, so that the processing for the branch instruction is speeded up. Accordingly, the branch instruction and other instructions are processed in parallel.

Conventionally, since an operation instruction and a load/store instruction have been processed in parallel, the parallel pipelined instruction processing system has been such that a processing unit for an operation instruction, a processing unit for a load/store instruction and a processing unit for a branch instruction can operate in parallel to each other.

Because the processing unit used for exclusively processing the branch instruction has been added, a conditional branch instruction can be executed at a high speed, and when a branch condition is satisfied, no delay is generated by the branching. Therefore, the processing flow of the pipelined processing is not disturbed. In addition, since the independent instruction processing units are controlled in parallel to each other, a VLIW type instruction composed of a plurality of instruction fields controlling the respective instruction processing units has been adopted as an instruction format.

The performance of the parallel pipelined instruction processing type parallel instruction processing system is dependent upon how many instruction functions are filled into each instruction block. In order to optimize a program, a local optimization and a wide area optimization have been known. Now, consider a flow of basic operations having no branch operation excepting for an exit of the flow and in which an branch from an external source is not received excepting for an inlet of the flow. This is called a "basic block" in the specification. The local optimization is to check dependency between items of data in each basic block, to detect basic operations which can be executed in parallel, and to combine the detected basic operation into a VLIW type instruction. On the other hand, the wide area optimization is an optimization accompanied with movement of basic operations between basic blocks.

However, in the parallel pipelined instruction processing type parallel instruction processing system, the conditional branch instructions are very many, and a length of the basic block is short. As a result, a large effect cannot be obtained by these optimization procedures.

In view of the above, the parallel pipelined instruction processing type parallel instruction processing system has conventionally used an optimization procedure called a "trace scheduling method" which is very effective in the case that a condition branch has a large deviation (for example, application to chemical calculation and the like).

In the above mentioned parallel pipelined instruction processing type parallel instruction processing system, instructions other than a conditional branch instruction in an instruction block including the conditional branch instruction are executed regardless of whether or not a branch condition is satisfied. Therefore, it is necessary to fill, into an instruction block including a conditional branch instruction, instructions that can be executed independently of satisfaction/failure of the branch condition, as instructions other than the conditional branch instruction in the instruction block including the conditional branch instruction.

Now, consider a parallel pipelined instruction processing system in which four instruction pipelined processing units are arranged in parallel so as to execute a VLIW type instruction having four fields. One stage of the four parallel processing units is used for exclusively processing only branch instructions, so that the parallel pipelined instruction processing system having no delay caused by the conditional branch is established.

In this case, the instruction block including the conditional branch instruction has three instruction fields other than the conditional branch instruction. As mentioned hereinbefore, it is necessary to fill into the three fields, instructions that can be executed regardless of satisfaction/failure of the branch condition. If the three fields are not filled, three empty fields occur at maximum.

Now, consider the delayed branch mechanism for the parallel pipelined instruction processing system having one machine cycle of branch delay. This parallel pipelined instruction processing system has a delayed instruction slot corresponding to one slot. Since one instruction is composed of four instruction fields, the delayed instruction slot equivalently corresponds to four instructions. In addition, three instruction fields of the instruction itself having the branch instruction need to be treated similarly to the delayed instruction slot in view of the instruction dependency. Therefore, the four-parallel pipelined instruction processing system can be considered to be equivalent to a serial pipelined instruction processing system having seven delayed instruction slots.

As mentioned hereinbefore, in the delayed branch mechanism for non-parallel instruction pipelined processing, a probability of filing even one valid instruction into an instruction slot immediately after the branch instruction is about 80% to 90% even if the current compiler technology is used. In view of this circumstance, it is extremely difficult to effectively utilize the seven empty instruction slots. Accordingly, the parallel pipelined instruction processing system utilizing the conventional pipelined mechanism having the branch delay of one machine cycle decreases its processing performance when a branch instruction is executed.

Even in the parallel pipelined instruction processing system which does not utilize the delayed branch, it is necessary to file executable instructions into three instruction fields of an instruction block having a conditional branch instruction by means of the instruction scheduling. Therefore, NOP instructions have to be filled into most of the instruction fields. Therefore, even in the parallel pipelined instruction processing system which does not utilize the delayed branch, since the number of the empty instruction fields in the instruction block including the conditional branch instruction increases, the processing performance is remarkably decreased when the instruction block including the conditional branch instruction is executed.

As mentioned above, the trace scheduling is effective in optimizing the basic operations on a long trace. On the other hand, since a copy of blocks frequently occurs, a code size of a program becomes very large.

SUMMARY OF THE INVENTION

Accordingly, it is an object of the present invention to provide a parallel pipelined instruction processing system which has overcome the above mentioned defect of the conventional one.

Another object of the present invention is to provide a parallel pipelined instruction processing system capable of preventing the increase of empty instruction fields in an instruction block including a branch instruction without using the delay branch.

Still another object of the present invention is to provide a parallel pipelined instruction processing system capable of preventing the increase of empty instruction fields in an instruction block including a conditional branch instruction so as to have an increased processing performance, by providing an instruction execution selection function capable of selecting an instruction execution on the basis of satisfaction/failure of a branch condition, into instructions other than a conditional branch instruction included in an instruction block having the conditional branch instruction.

A further object of the present invention is to provide a parallel pipelined instruction processing system capable of reducing an execution processing time of a loop by generating an valid code using the execution selection processing, so as to increase the processing performance.

The above and other objects of the present invention are achieved in accordance with the present invention by a parallel pipelined instruction processing system for executing a plurality of instructions in parallel without any branch delay, comprising a instruction block fetch means for fetching an instruction block including at least one instruction field and one branch instruction field, at least one instruction execution unit receiving an instruction included in the instruction field of the instruction block held in the instruction block fetch means and for executing the received instruction, and a branch instruction execution unit receiving a branch instruction included in the branch instruction field of the instruction block held in the instruction block fetch means and for executing a processing for the received branch instruction, the branch instruction execution unit including an operand fetch means receiving the branch instruction included in the branch instruction field of the instruction block held in the instruction block fetch means and for fetching an operand to be used for the received branch instruction, from a data register means, and an address generation means receiving the branch instruction included in the branch instruction field of the instruction block held in the instruction block fetch means and for simultaneously generating a next address of an instruction to be next fetched and a branch destination address for the received branch instruction, the address generation means operating to output one of the next address and the branch destination address on the basis of the content of the operand fetch means.

The above and other objects, features and advantages of the present invention will be apparent from the following description of preferred embodiments of the invention with reference to the accompanying drawings.

DESCRIPTION OF THE PREFERRED EMBODIMENTS

Figure 1:
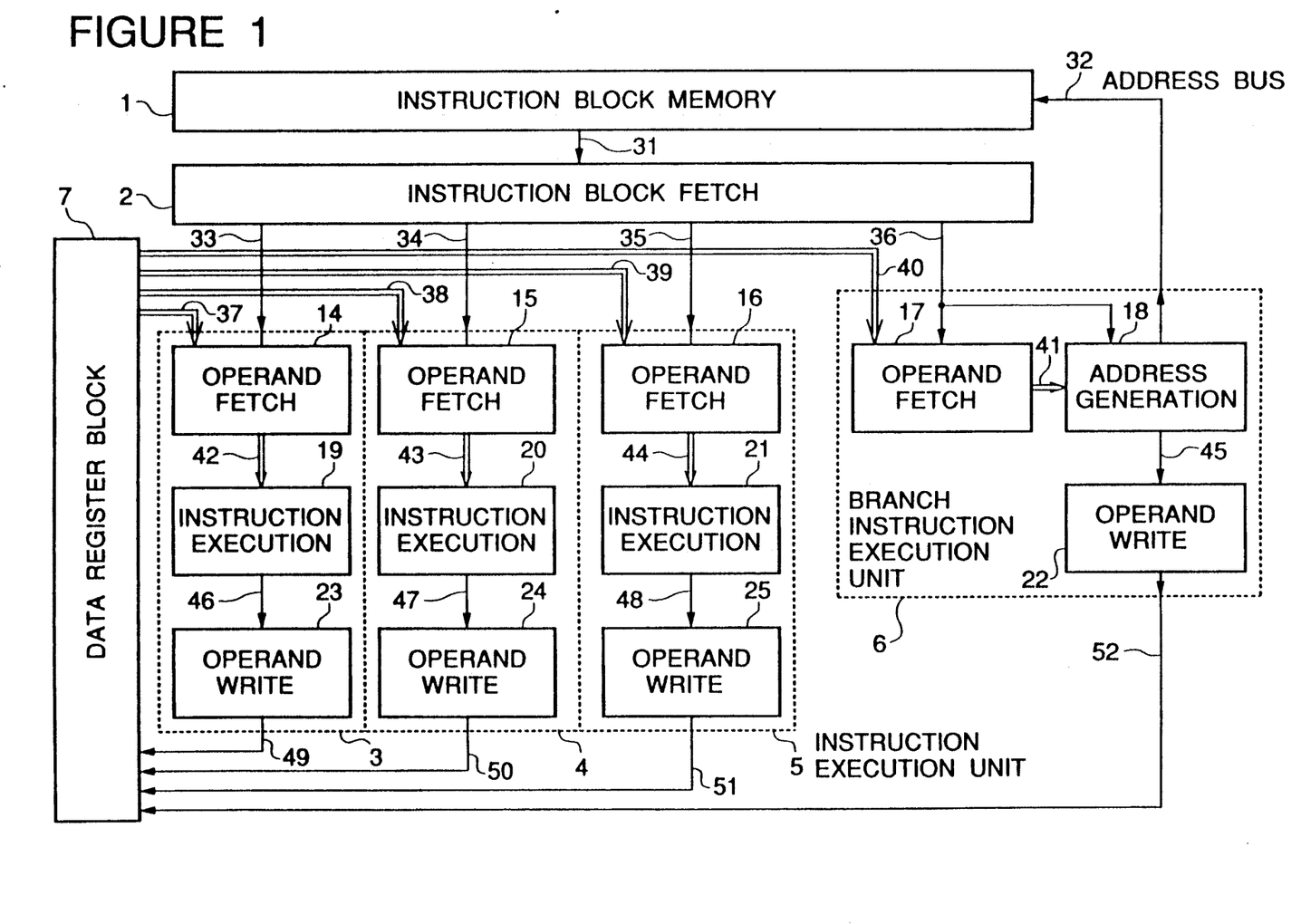
FIG. 1 is a block diagram of a first embodiment of the parallel pipelined instruction processing system of a four-parallel type in accordance with the present invention.

Referring to FIG. 1, there is shown a block diagram of a first embodiment of the parallel pipelined instruction processing system of a four-parallel type in accordance with the present invention. Therefore, the shown parallel pipelined instruction processing system is configured to execute four instructions in parallel by a VLIW type parallel instruction trains composed of four instructions.

Figure 2:
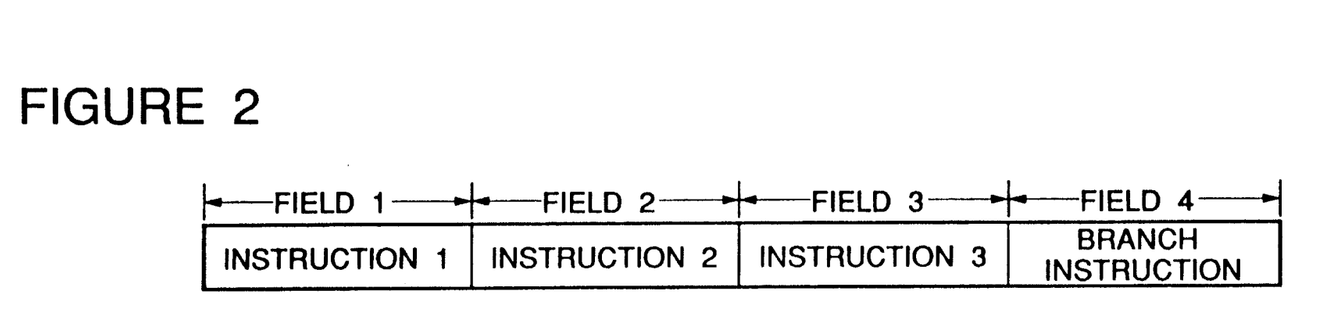
FIG. 2 shows an instruction format used in the parallel pipelined instruction processing system shown in FIG. 1.

The parallel pipelined instruction processing system includes an instruction block memory 1, and an instruction block fetching unit 2 coupled to the instruction block memory 1 through an instruction block bus 31 so as to fetch a memory block designated by an address bus 32, from the instruction block memory 1 through the instruction block bus 31. For example, an instruction (1), an instruction (2), an instruction (3) and a branch instruction included in an instruction block shown in FIG. 2 are transferred through instruction buses 33 to 36 to instruction execution units 3 to 5 and a branch instruction execution unit 6, respectively. Each of the instruction execution units 3 to 5 is configured to decode the transferred instruction, to fetch an operand to be used in the transferred instruction through a register read bus 37 to 40, to execute the transferred instruction, and then, to write a result of execution of the instruction to a data register group 7 through register write buses 49 to 51.

On the other hand, the branch instruction execution unit 6 decodes the transferred branch instruction, and executes generation of an branch destination address. At the same time, an instruction block address internally held in the branch instruction execution unit 6 is incremented to generate a next address to be fetched. In addition, satisfaction/failure of a branch condition is discriminated by referring to an operand given through a register read bus 40. When a branch is generated, a branch destination address is generated to the address bus 32, and when a branch is not generated, a next address is outputted to the address bus 32. If the branch instruction is a branch-and-link instruction including a processing of storing a next address into a register, a branch destination address is outputted to the address bus 32, and at the same time, the next address is written to the data register group 7 through the register write bus 52.

The fourth instruction execution unit of the shown parallel pipelined instruction processing system is used exclusively for the branch instruction, so that the next address or the branch destination address can be outputted to the address bus without a delay caused by the conditional branch.

Each of the instruction execution units 3 to 5 includes an operand fetch circuit 14, 15 or 16 coupled to the instruction block fetch unit 2 through an instruction bus 33, 34 or 35, and also coupled to the data register group 7 through a register read bus 37, 38 or 39. The operand fetch circuit 14, 15 or 16 is coupled to an associated instruction execution circuit 19, 20 or 21 through a source operand bus 42, 43 or 44, so that an operand fetched in the operand fetch circuit is transferred to the instruction execution circuit. The instruction execution circuit 19, 20 or 21 is coupled to an operand write circuit 23, 24 or 25 through a destination operand bus 46, 47 or 48 so that the result of execution of the instruction is transferred to the operand write circuit. Each of the operand write circuit 23, 24 and 25 is coupled to the data register group 7 through a corresponding one of the register write buses 49, 50 and 51.

On the other hand, the branch instruction execution unit 6 includes an operand fetch circuit 17 coupled to the instruction block fetch unit 2 through an instruction bus 36, and also coupled to the data register group 7 through a register read bus 40. The operand fetch circuit 17 is coupled to an address generation circuit 18 through a source operand bus 41, so that an operand fetched in the operand fetch circuit 17 is transferred to the address generation circuit 18. The address generation circuit 18 is coupled to an operand write circuit 22 through a destination operand bus 45 so that the next address is transferred to the operand write circuit 22. The operand write circuit 22 is coupled to the data register group 7 through the register write bus 52.

The data register group 7 includes eight reading ports and four writing ports. Each of the register read buses 37, 38, 39 and 40 are composed of two buses, and also, each of the source operand buses 41, 42, 43 and 44 are composed of two buses.

Turning to FIG. 2, the shown instruction block used in the parallel pipelined instruction processing system shown in FIG. 1 includes four instruction fields, which are called "FIELD 1", "FIELD 2", "FIELD 3" and "FIELD 4" from a MSB (most significant bit) side, respectively. The first to third instruction fields "FIELD 1", "FIELD 2" and "FIELD 3" are assigned to non-branch instructions "INSTRUCTION 1", "INSTRUCTION 2" and "INSTRUCTION 3", and the four instruction field "FIELD 4" is assigned to a branch instruction "BRANCH INSTRUCTION".

Figure 3:
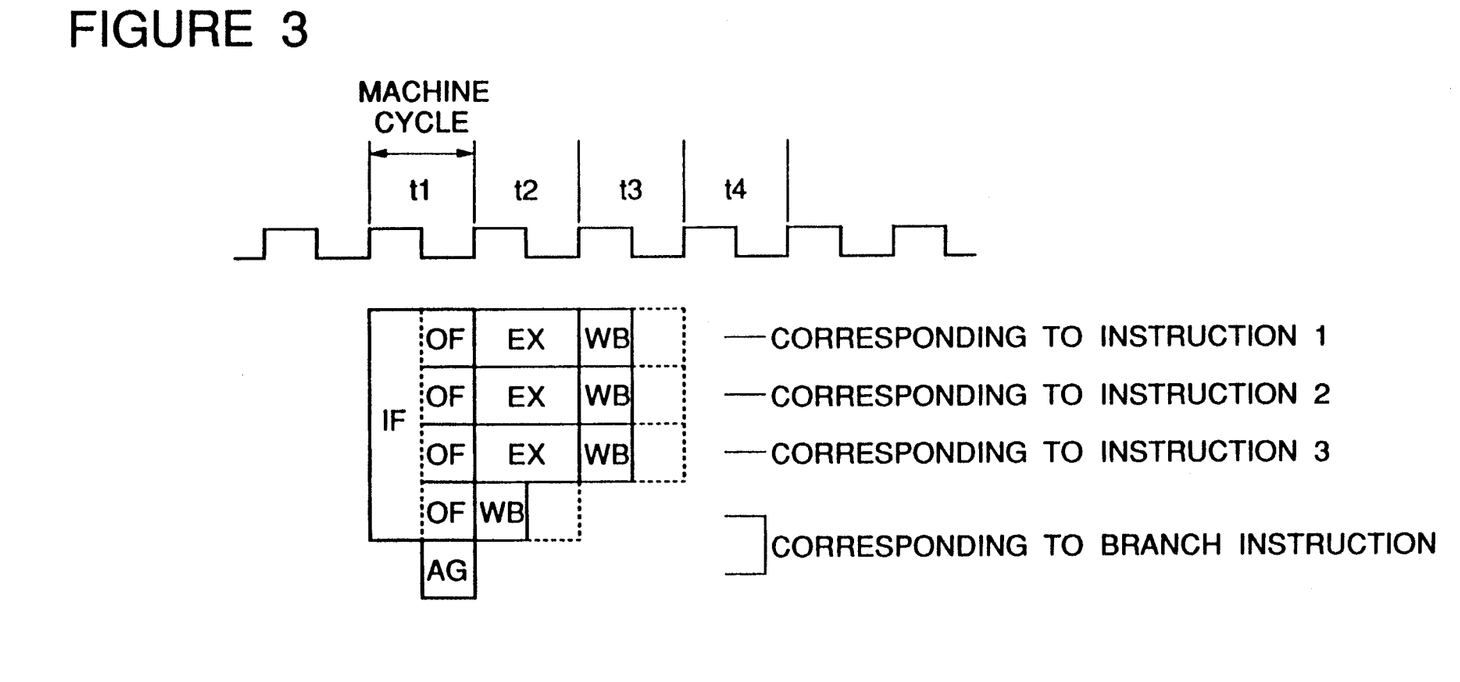
FIG. 3 illustrates one example of the pipelined processing.

Referring to FIG. 3, there is shown a pipelined structure used in the parallel pipelined instruction processing system shown in FIG. 1. In FIG. 3,
IF indicates an instruction block fetch;
OF indicates an operand fetching;
AG indicates an address generation;
EX indicates an execution of operation; and
WB indicates a writing back.

Figure 4:
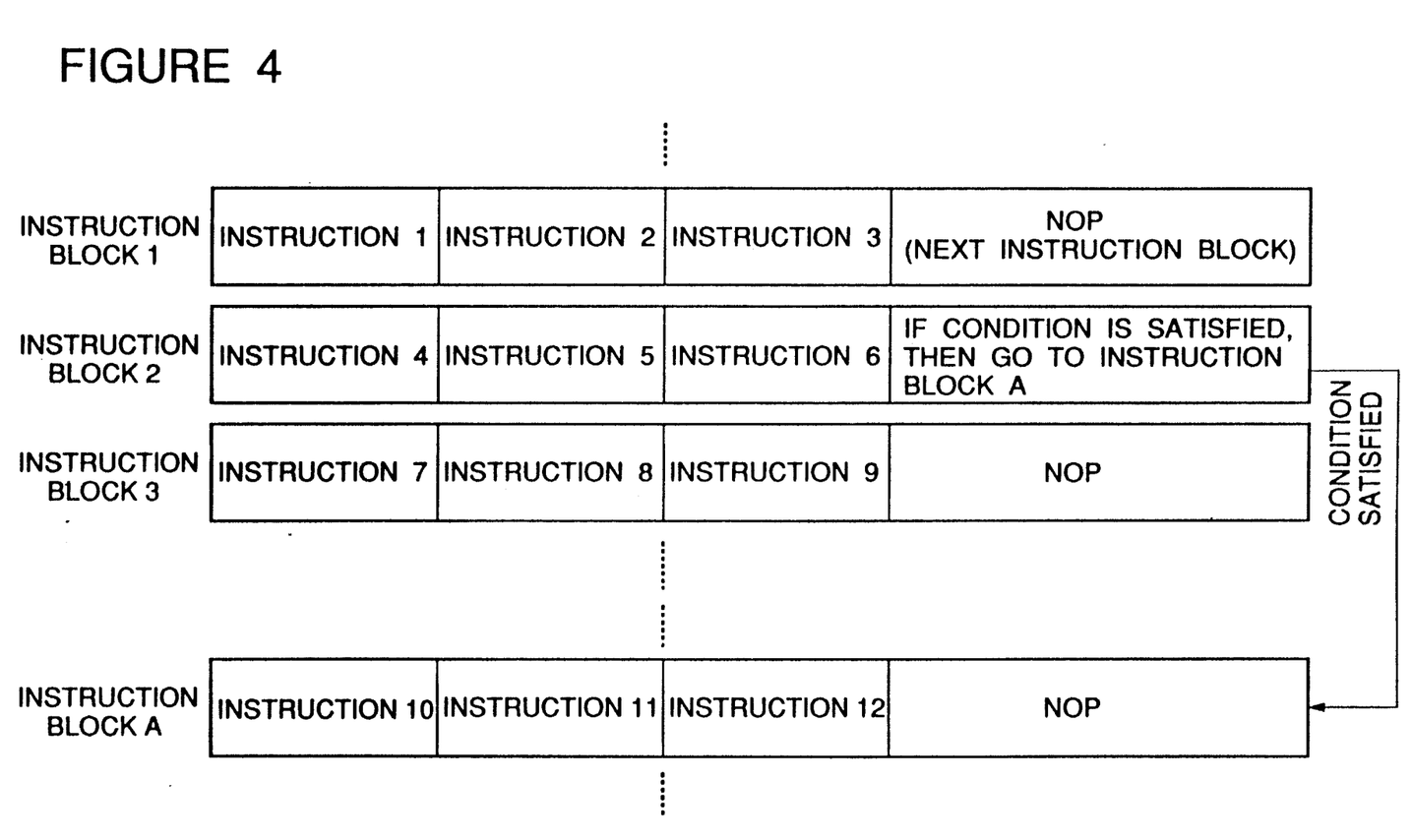
FIG. 4 shows one example of a program sequence including a conditional branch instruction.
Figure 5:
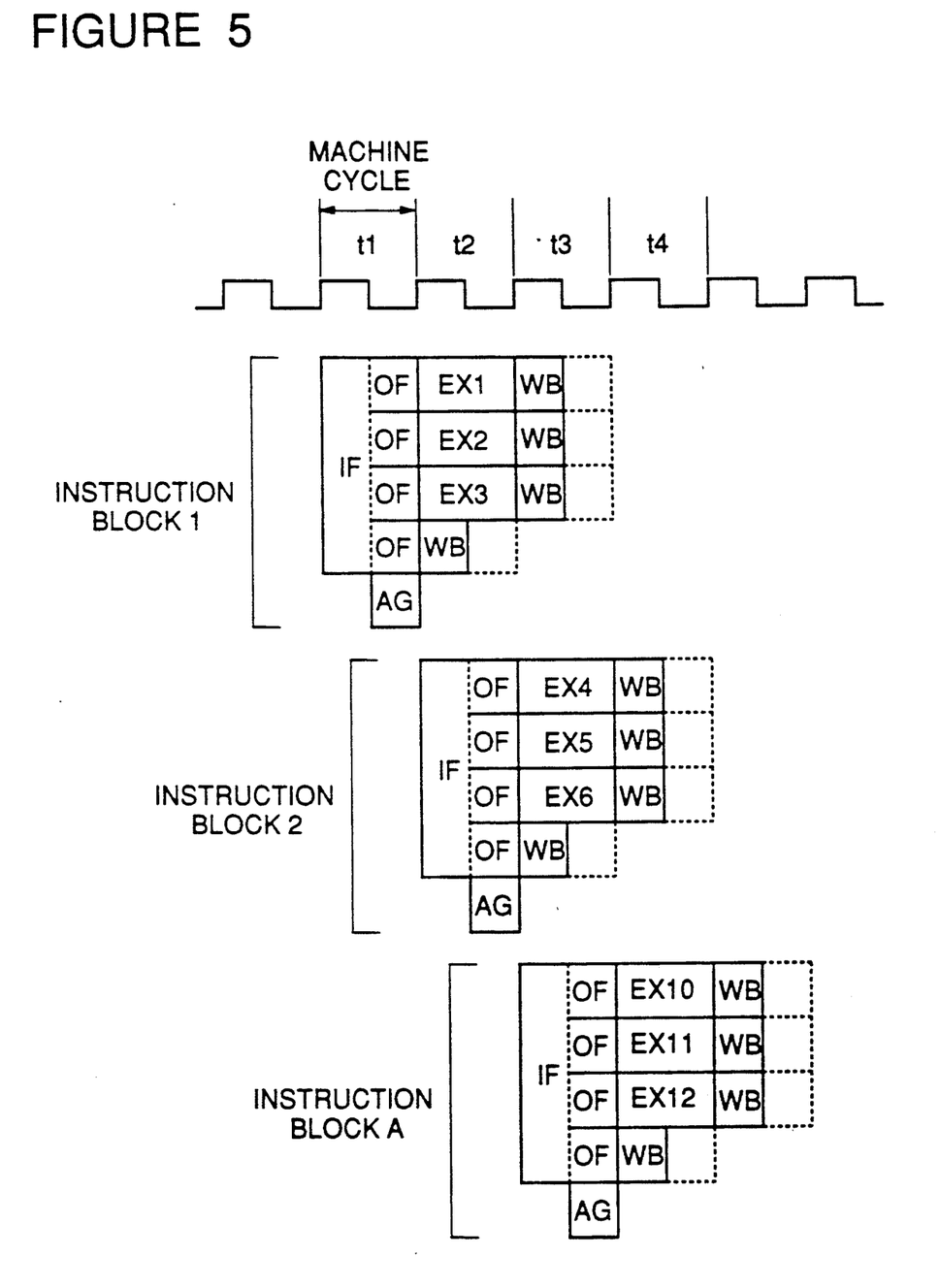
FIG. 5 illustrates one example of the pipelined instruction processing when the instruction shown in FIG. 4 is executed.

FIG. 4 shows an example of a program sequence including a conditional branch instruction, and FIG. 5 shows an operation of the instruction pipelined operation in the parallel pipelined instruction processing system shown in FIG. 1 for executing the program sequence shown in FIG. 4. In FIGS. 4 and 5,
IF indicates an instruction block fetch;
OF indicates an operand fetching;
AG indicates an address generation;
EX 1 to 6 and 10 to 12 indicate an execution of respective
operations; and
WB indicates a writing back of the operand.

In the shown example of the program sequence, the instruction block 1 has no branch instruction, and the fourth instruction field "FIELD 4" is filled with an NOP instruction. Therefore, the instruction block 1 should be executed as it is. On the other hand, the instruction block 2 has a conditional branch instruction filled into the fourth instruction field "FIELD 4". If the branch condition is satisfied, the program sequence jumps to the instruction block A. If the branch condition is not satisfied, the program sequence moves to the next instruction block 3 with no branch.

First, an operation of the parallel pipelined instruction processing system shown in FIG. 1 when an instruction block is executed will be described with reference to FIGS. 1 and 2.

The instruction block fetch unit 2 fetches from the instruction block memory 1 an instruction block designated by the address bus 32. In addition, the instruction block fetch unit 2 supplies the instruction (1), the instruction (2), the instruction (3) and the branch instruction shown in FIG. 2 to the operand fetch circuits 14, 15, 16 and 17 and the address generation circuit 18 through the instruction buses 33, 34, 35 and 36, respectively.

Then, each of the operand fetch circuits 14, 15, 16 and 17 decodes the transferred or received instruction, and fetches an operand or operands to be used in the received instruction from the data register group 7 through the associated register read bus 37, 38, 39 or 40. The operand fetch circuits 14, 15 and 16 supply their fetched operand or operands to the corresponding instruction execution circuits 19, 20 and 21 through the source operand buses 42, 43 and 44, respectively. On the other hand, the operand fetch circuit 17 supplies its fetched operand or operands to the address generation circuit 19, 20 and 21 through the source operand buses 41. The above operation is the same for all instruction processings.

Each of the instruction execution circuits 19, 20 and 21 executes the corresponding instruction by using the operand or operands transferred through the associated operand bus 42, 43 or 44, and transfers the result of the execution to the corresponding operand write circuit 23, 24 or 25 through the associated destination operand bus 49, 50 to 51, respectively. Each of the operand write circuits 23, 24 and 25 writes the received result of execution (result operand) through the associated register write bus 49, 50 or 51 to a register of the data register group 7 designated by the corresponding instruction.

On the other hand, the address generation circuit 18 increments the instruction block address internally held therein so as to generate a next address. At the same time, the branch instruction given through the instruction bus 36 is decoded so as to generate a branch destination address. In addition, an operand given through the source operand bus 41 is examined so as to discriminate satisfaction/failure of the branch condition. If the branch condition is satisfied, the branch destination address is outputted through the address bus 32. On other hand, if branch condition is not satisfied, the next address is outputted through the address bus 32. If the branch instruction is a branch-and-link instruction including a processing of storing a next address into a register, a branch destination address is outputted to the address bus 32, and at the same time, the next address is transferred through the destination operand bus 45 to the operand write circuit 22 so that the next address is written to the data register group 7 through the register write bus 52 by the operand write circuit 22.

A timing of the above mentioned operation will be explained with reference to FIG. 3 illustrating a flow of processing when one instruction block is executed.

In FIG. 3, processings shown in first and third rows correspond to processings for the instruction (1), the instruction (2), and the instruction (3), respectively. A processing shown in last two rows corresponds to a processing for the branch instruction. A timing where the instruction block fetch unit 2 fetches an instruction block from the instruction block memory 1 corresponds to IF. Similarly, the timing of the operand fetching of the operand fetch circuits 14 to 17 from the data register group 7 correspond OF. The generation of the next address and the branch destination address of the address generation circuit 18 corresponds to AG. The instruction execution of the instruction execution circuits 19 to 21 correspond to EX. The operand writing of the operand write circuits 22 to 25 correspond to WB.

Now, consider when the shown parallel pipelined instruction processing system processes the program sequence shown in FIG. 4. In the example shown in FIG. 4, the instruction block 2 includes such a conditional branch instruction that if a branch condition is satisfied, the sequence branches from the instruction block 2 to an instruction block A. FIG. 5 shows the operation of the pipelined processing when the program sequence shown in FIG. 4 is executed.

In a processing of the instruction block 2, the stage or unit processing the branch field simultaneously executes the fetching of the operand and the generation of the next address and the branch destination address in parallel, and determines on the basis of a content of the fetched operand at an end of a machine cycle t2, which of the next address and the branch destination address should be selected. The selected address is outputted to the address bus 32. Therefore, the processing for the instruction block A can start from a machine cycle 13. On the other hand, if the instructions (4) to (6) are ordinary instructions, the instructions (4) to (6) are executed regardless of whether or not the branch condition is satisfied.

Accordingly, when the instruction block including the branch instruction is executed, no empty slots occur in the instruction block including the branch instruction. Accordingly, it is possible to realize a highly efficient parallel pipelined instruction processing system which combines the instruction pipelined processing with the VLIW type parallel processing that realizes parallel processing by means of a simple hardware and a parallel instruction scheduling at the time of compiling.

In addition, empty slots in instruction blocks which have to be filled by the compiler can be decreased in comparison with the conventional system. For example, in order to exhibit a maximum performance in the conventional parallel pipelined instruction processing system having the branch delay of one machine cycle, the compiler is required to fill valid instructions into six instruction slots consisting of three slots for the instructions (4) to (6) and three slots included in the next instruction block. However, in the shown embodiment of the parallel pipelined instruction processing system in accordance with the present invention, it is sufficient if only the three slots for the instructions (4) to (6) are filled with valid instructions. Therefore, the parallel instruction scheduling becomes easy.

Figure 6:
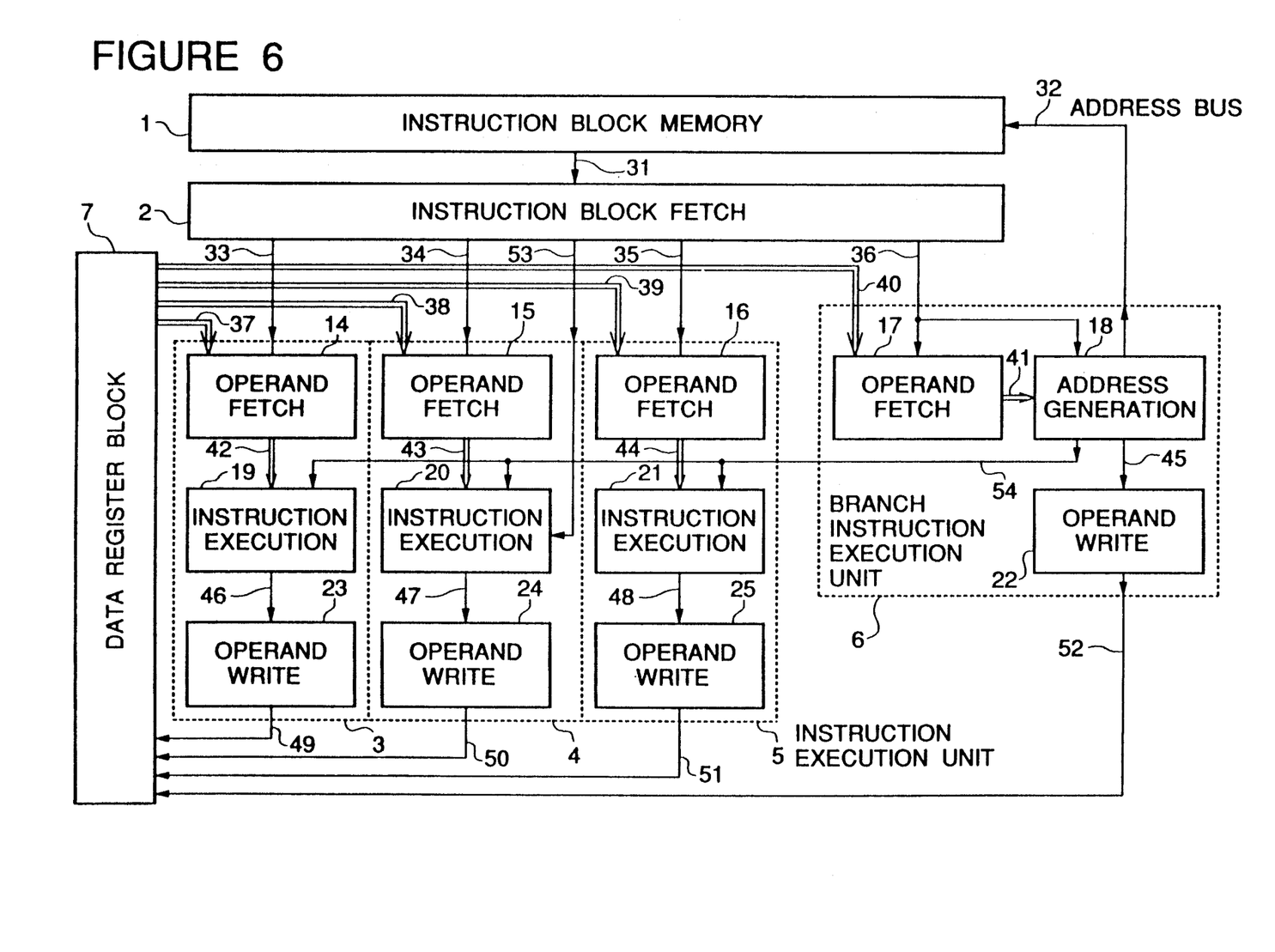
FIG. 6 is a block diagram of a second embodiment of the parallel pipelined instruction processing system of the four-parallel type in accordance with the present invention.

Referring to FIG. 6, there is shown a block diagram of a second embodiment of the parallel pipelined instruction processing system of the four-parallel type in accordance with the present invention. In FIG. 6, elements corresponding to those shown in FIG. 1 are given the same Reference Numerals, and explanation thereof will be omitted for simplification of description.

As seen from comparison between FIGS. 1 and 6, the second embodiment is modified to the effect that the instruction block fetch unit 2 outputs an execution selection plus/minus signal 53 to the instruction execution circuits 19 to 21, and the address generation circuit 18 outputs an branch condition satisfaction signal 54 to the instruction execution circuits 19 to 21. FIG. 6 shows the case in which the execution selection plus signal 53 is outputted to only the instruction execution circuit 20.

Similarly to the first embodiment, the second embodiment is the parallel pipelined instruction processing system having no branch delay. Now, a flow of a program sequence including an conditional branch instruction and an instruction having an execution selection function will be explained.

Figure 7:
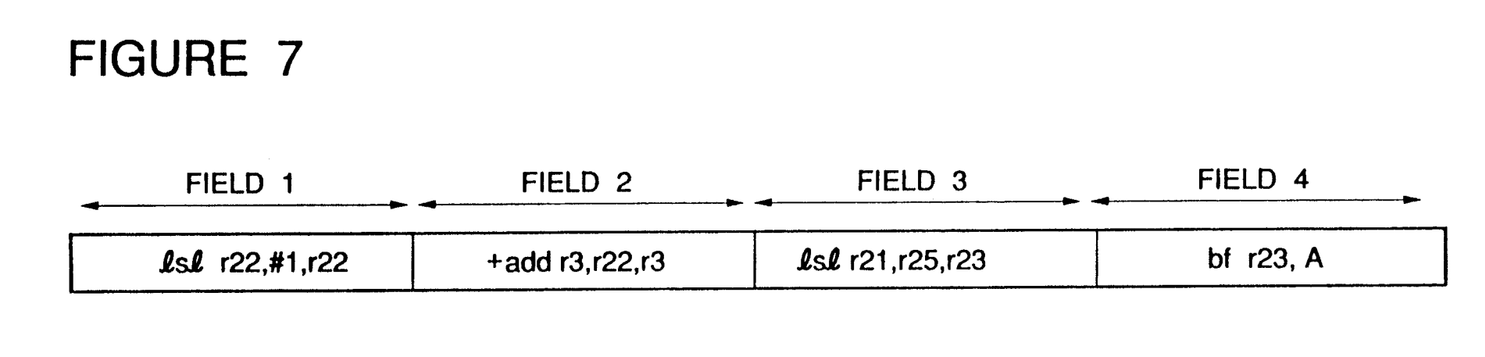
FIG. 7 shows one example of an instruction block executed in the second embodiment having a conditional branch instruction.

Each instruction block is constituted as shown in FIG. 2, similarly to the case of the first embodiment. In addition, assume that the instruction block 2 shown in FIG. 4 is an instruction block as shown in FIG. 7. In the instruction block shown in FIG. 7, the instruction fields 1 and 3 are filled with a logical shift instruction (lsl: Logical Shift Left), and the instruction field 2 is filled with an addition instruction. The instruction field 4 is filled with a conditional branch instruction (if a value of a register "r23" is "0", a branch condition is satisfied).

Figure 8:
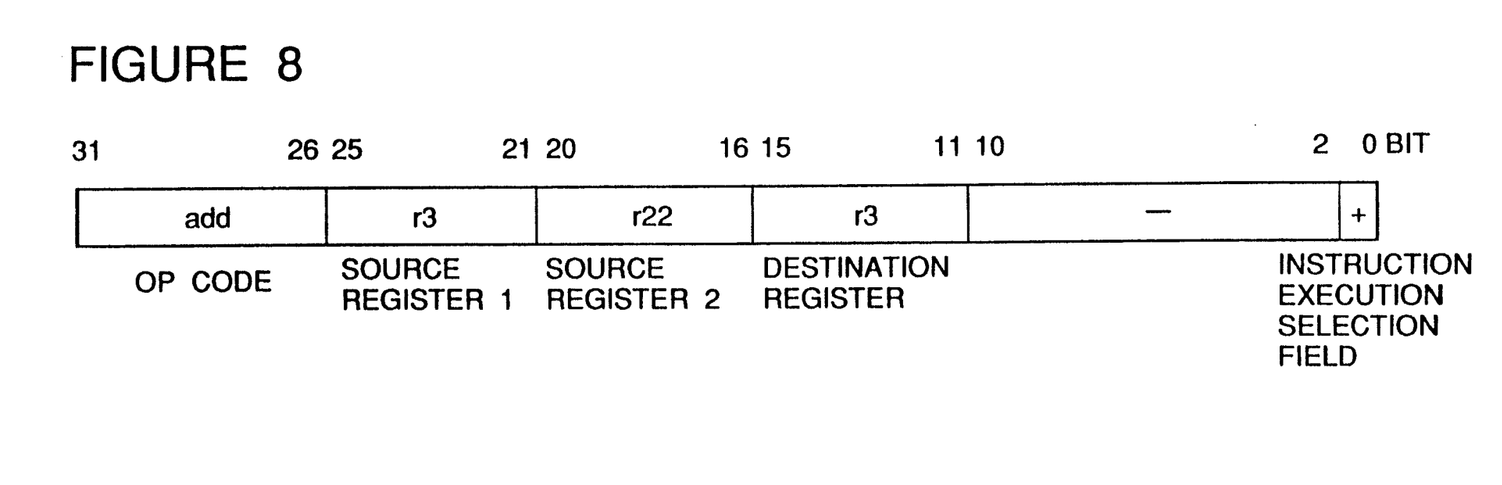
FIG. 8 shows one example of an instruction format including an instruction execution selection field in the second embodiment.

Here, a sign "+" is added to a head of the addition instruction of the instruction field 2. FIG. 8 shows a diagrammatic arrangement of an object format of this addition instruction. The object code has a length of 32 bits, a portion of which is assigned to fields for an op code, a register 1, the source register 2, and the destination register. Namely, these fields are filled with respective object codes for the op code, the source register 1, the source register 2, and the destination register, respectively. In addition, 0th and 1th bits of the format shown in FIG. 8 form an instruction execution selection field for selecting whether or not the instruction should be executed, on the basis of a condition of a conditional branch instruction included in the instruction block concerned.

In the instruction block shown in FIG. 7, the instruction field 4 includes the conditional branch instruction, and it is desired to execute the instruction field 2 only when the branch condition is satisfied. For this purpose, the sign "+" is added to the head of the instruction field 2. In this case, the instruction execution selection field of the object code is filled with a code "01". With this setting, when this instruction block is executed, if the branch condition is satisfied, the instruction of the instruction field 2 is executed. To the contrary, if the condition is not satisfied, the instruction of the instruction field 2 is not executed.

If it is desired to execute the instruction field 2 only when the branch condition is not satisfied, a sign "−" is added to the head of the instruction field 2. In this case, the instruction execution selection field of the object code is filled with a code 10. On the other hand, if an instruction can be executed regardless of satisfaction/failure of the branch condition, the instruction is described with neither the sign "+" nor the signal "−". In this case, the instruction execution selection field of the object code is filled with a code "00".

Now, a sequence of executing the instruction block shown in FIG. 7 will be explained.

The instruction block fetch unit 2 fetches from the instruction block memory 1 an instruction block designated by the address bus 32. In addition, the instruction block fetch unit 2 supplies the instruction (4), the instruction (5), the instruction (6) and the branch instruction shown in FIG. 7 to the operand fetch circuits 14, 15, 16 and 17 through the instruction buses 33, 34, 35 and 36, respectively. At the same time, the instruction block fetch unit 2 outputs the execution selection plus signal 53 to the instruction execution circuit 20, since the instruction execution selection field of the instruction field 2 of the instruction block shown in FIG. 7 is "+". Since the instruction execution selection field of the other instruction fields of the instruction block shown in FIG. 7 is filled with "00", the execution selection plus signal 53 is not outputted.

Then, each of the operand fetch circuits 14, 15, 16 and 17 decodes the transferred or received instruction, and fetches an operand or operands to be used in the received instruction from the data register group 7 through the associated register read bus 37, 38, 39 or 40. The above mentioned operation is the same for all of the three instruction execution units 3 to 5.

On the other hand, the address generation circuit 18 of the branch instruction execution unit 6 increments the instruction block address internally held therein so as to generate a next address. At the same time, the branch instruction given through the instruction bus 36 is decoded so as to generate a branch destination address. In addition, an operand given through the source operand bus 41 is examined so as to discriminate satisfaction/failure of the branch condition. If the branch condition is satisfied, the branch destination address is outputted through the address bus 32. On the other hand, if the branch condition is not satisfied, the next address is outputted through the address bus 32. In addition, if the branch condition is satisfied and the branch is executed, the branch condition satisfaction signal 54 of "1" is outputted to the instruction execution circuit 19 to 21. If branch condition is not satisfied, the branch condition satisfaction signal 54 of "0" is generated. If the branch instruction is a branch-and-link instruction including a processing of storing a next address into a register, a branch destination address is outputted to the address bus 32 and the branch condition satisfaction signal 54 is outputted, and at the same time, the next address is transferred through the destination operand bus 45 to the operand write circuit 22 so that the next address is written to the data register group 7 through the register write bus 52 by the operand write circuit 22.

Each of the instruction execution circuits 19 and 21 executes the corresponding instruction by using the operand or operands transferred through the associated source operand bus 42 or 44, and transfers the result of the execution to the corresponding operand write circuit 23 or 25 through the associated destination operand bus 49 or 51, respectively. Each of the operand write circuits 23 and 25 writes the received result of execution (result operand) through the associated register write bus 49 or 51 to a register of the data register group 7 designated by the corresponding instruction.

On the other hand, since the execution selection plus signal 53 is active, if the branch condition satisfaction signal 54 is active, the instruction execution circuit 20 executes the corresponding instruction by using the operand or operands transferred through the associated source operand bus 43, and transfers the result of the execution to the corresponding operand write circuit 24 through the associated destination operand bus 47, respectively. The operand write circuit 24 writes the received result of execution (result operand) through the associated register write bus 50 to a register of the data register group 7 designated by the corresponding instruction.

However, if the branch condition satisfaction signal 54 is inactive, since the execution selection plus signal 53 is active, the given instruction is not executed by the instruction execution circuit 20. In this case, therefore, neither the instruction execution circuit 20 nor the operand write circuit 24 executes any action.

The above mentioned example is the case in which the instruction execution selection field is "+". In the case that the instruction execution selection field is "−", the instruction block fetch unit 2 outputs the execution election minus signal to the corresponding instruction execution circuit. In this case, if the branch condition satisfaction signal 54 is active, the given instruction is not executed by the corresponding instruction execution circuit. To the contrary, if the branch condition satisfaction signal 54 is inactive, the given instruction is executed by the corresponding instruction execution circuit.

The above mentioned relation can be shown in the following TABLE 1 and TABLE 2.

TABLE 1

| Instruction Execution Selection Field | Execution Selection Signal | Meaning (status of condition) |
|---|---|---|
| none | 00 | executed regardless of satisfaction/failure |
| + | 01 | executed when satisfied |
| − | 10 | executed when not satisfied |

As seen from the above TABLE 1, if the instruction execution selection field is "+", the corresponding instruction is executed only when the branch condition is satisfied. On the other hand, if the instruction execution selection field is "−", the corresponding instruction is executed only when the branch condition is not satisfied. When none is designated in the instruction execution selection field, the corresponding instruction is executed regardless of satisfaction/failure of the branch condition.

TABLE 2

| Execution Selection Signal | Branch Condition Satisfaction Signal | Output of the Result of Instruction Execution circuit |
|---|---|---|
| 00 | 0 | outputted |
|  | 1 | outputted |
| 01 | 0 | not outputted |
|  | 1 | outputted |
| 10 | 0 | outputted |
|  | 1 | not outputted |

In the above TABLE 2, the fact that the result of the execution of the instruction execution circuit is not outputted is equivalent to the fact that the instruction is not executed.

As seen from the above description, the second embodiment of the parallel pipelined instruction processing system is such that instruction fields other than a conditional branch instruction included in an instruction block are provided with the instruction execution selection function capable of selecting, on the basis of satisfaction/failure of the branch condition, whether or not the instruction should be executed. Therefore, it is possible to fill an instruction that can be executed only when the branch condition is satisfied or not satisfied, into an instruction block including a conditional branch instruction. Accordingly, increase of empty fields can be effectively prevented.

The pipelined instruction processing system adopting this parallel instruction execution selection processing method is suitable for solving a problems at the time of a code generation in the parallel pipelined instruction instruction processing system. However, this code generation method cannot generate an optimized code for effectively utilizing this parallel instruction execution selection processing method. In order to optimize the code effective for the pipelined instruction processing system, it is necessary to generate codes effective for a loop for which a large portion of the execution time of a program is consumed.

Figure 9:
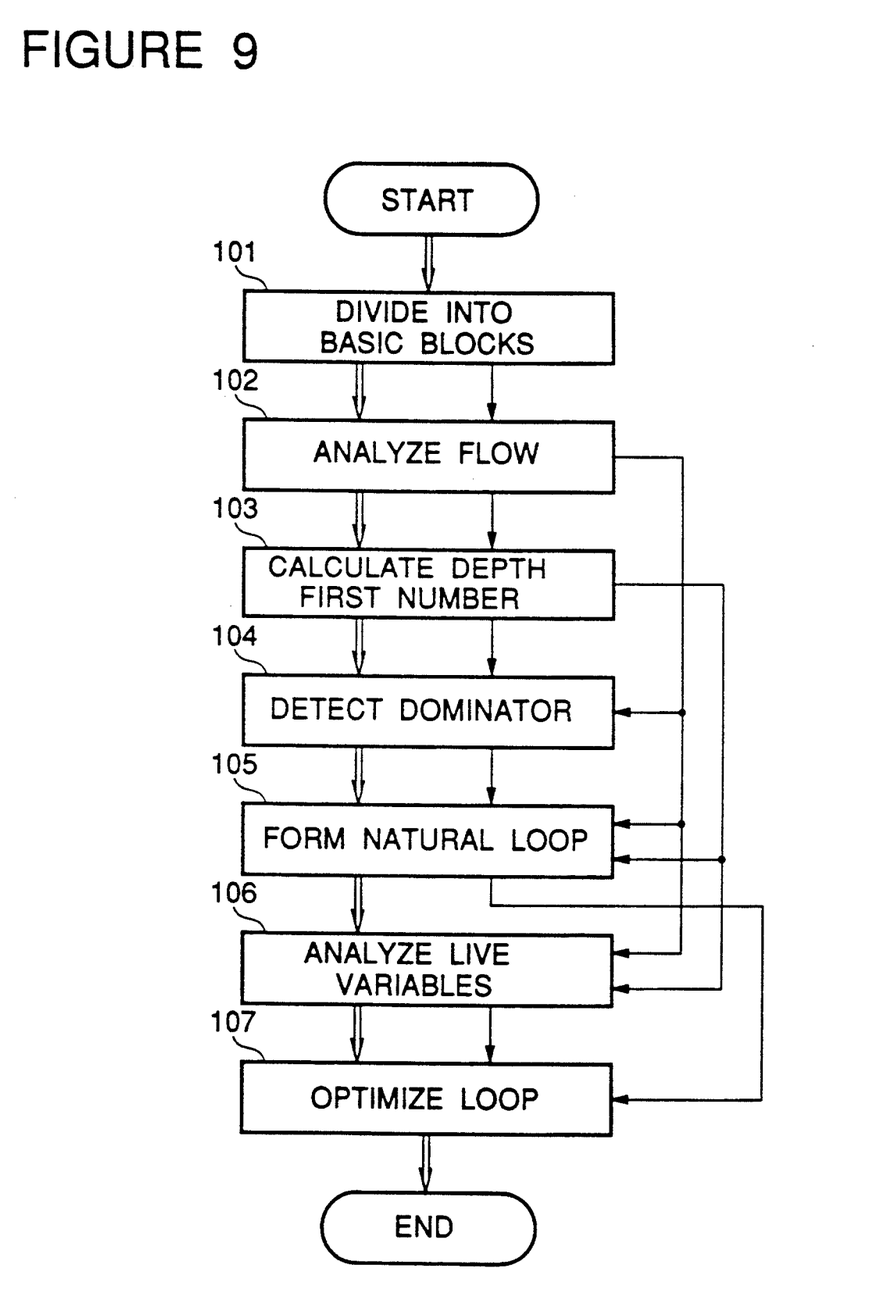
FIG. 9 is a flow chart illustrating a code optimizing method in the second embodiment.
Figure 10:
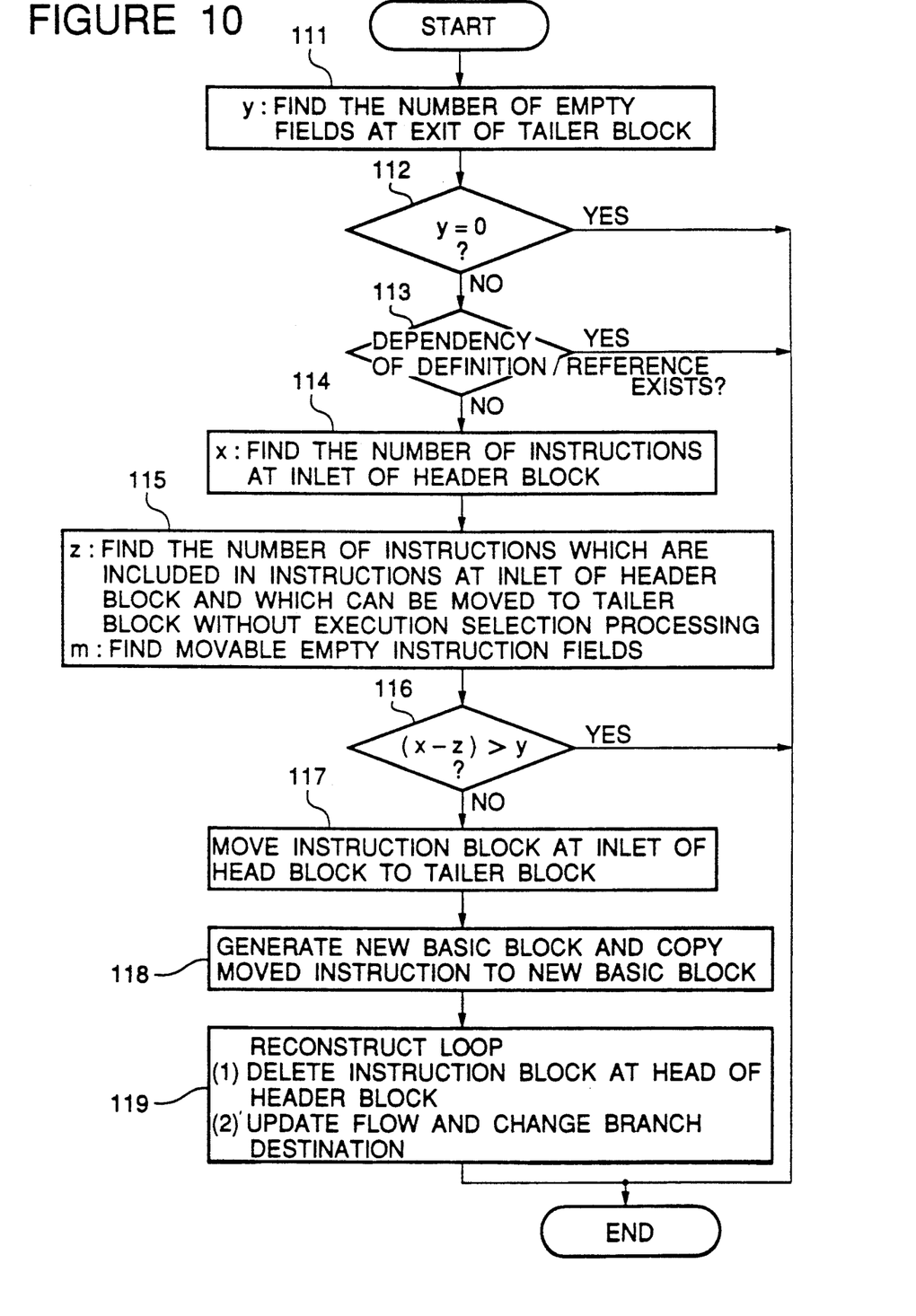
FIG. 10 is a flow chart illustrating for illustrating a loop optimizing section in the method shown in FIG. 9, and FIGS. 11 and 12 are program sequences of loops before and after optimization shown in FIG. 9.

Referring to FIGS. 9 and 10, there are shown a flow chart of a code optimizing method as the third embodiment of the present invention, and a flow chart of a loop optimizing part of the code optimizing method, respectively. In addition, referring to FIGS. 11 and 12, there are shown a program sequence before the optimization and a program sequence after the optimization, respectively, in the pipelined instruction processing system adopting the parallel instruction execution selection processing method. In this third embodiment, the pipelined instruction processing system shown in FIG. 6 adopting this parallel instruction execution selection processing method is used. Incidentally, here assume that a program has already been subjected to the current local optimization and the large area optimization which are obtained by the current optimizing compiler technique. Therefore, the program shown in FIG. 11 has a program sequence after the optimization has been made for movement of an in-loop fixed code to an external of the loop and induced variables (which are changed by a constant value at each repetition of the loop)

In step 101 of FIG. 9, "divide into basic blocks" is performed. Here, the "basic block" is a sequence of basic operations that are sequentially executed one by one from a heading instruction to a tailing instruction. If a branch instruction exists in a branch field, a block is broken in the way. Therefor, the basic block has no branch instruction in the way of the sequence of basic operations. Accordingly, an "inlet of the basic block" is a heading instruction block of the basic block, and an "exit of the basic block is a tailing instruction block of the basic block. Incidentally, for simplification of description, it is assumed that each instruction of the program is so arranged that the empty fields of the instruction blocks at the inlet and the exit of the basic block are increased to a possible extent.

In step 102 of FIG. 9, "analyze flow" is executed. In this step, label definition and reference relation are analyzed, and a flow of control between basic blocks are obtained. This flow of control is shown by a "former" and a "latter". For example, when the flow of control moves from a basic block A to a basic block B, it is described as "basic block A→basic block B", and the basic block A is called the former for the basic block B and the basic block B is called the latter for the basic block A.

A step 103 of FIG. 9, "calculate depth first number" is performed. When a flow of basic blocks of the program are traced by starting from a first basic block of the program so as to go as fast as possible to a basic block as far as possible from the first basic block of the program, and to finally return to the first basic block of the program, the number of the basic blocks of the longest trace is defined as the depth first number.

In step 104 of FIG. 9, "detect dominator" is performed. This dominator is defined so that all basic blocks necessarily executed before execution of a basic block concerned are called a dominator for the basic block concerned. For example, assuming that basic blocks A, B and C are sequentially executed in the named order, the basic block A can be called the dominator for the basic blocks B and C, and the basic block B can be called the dominator for the basic block C.

In step 105 of FIG. 9, "form natural loop" is executed. In a reverse direction flow of basic blocks "A→B" (the flow "A→B" in which the basic block A is dominated by the basic flow B), this natural loop can be defined as an array of basic blocks formed by adding the basic blocks A and B into a flow of basic blocks that can reach the basic block A without passing through the basic block B. Accordingly, in the case, the basic block B is called as a header block of this natural loop, and the basic block A is called as a tailing block of this natural loop.

In step 106 of FIG. 9, "analyze live variables" is performed. Considering a register "a" and some point "p" in the program, whether or not a value of the register "a" at the point "p" in the program can be used in any pass starting from the point "p" is analyzed. If the value can be used, it is said as being "live", and on the other hand, if the value cannot be used, it is said as being "dead".

In step 107 of FIG. 9, "optimize loop" is carried out. A code optimization is performed for each natural loop formed in the step 105, so as to generate a code effective for the pipelined instruction processing system adopting the parallel instruction execution selection processing system. the length of the loop (the number of instruction blocks forming the loop) is shortened, so that a time length required for executing the loop is shortened.

In step 107 of FIG. 9 for the loop optimization, a prediscrimination about whether or not the loop optimization is possible is carried out by steps 111 to 113 shown in FIG. 10 to which reference is now made.

In step 111, the number "y" of empty fields at the exit of the tailer block is found.

In step 112, whether or not the optimization is possible is discriminated on the basis of the number "y" of empty fields obtained in the step 111. If the number "y" of empty fields is "0" (zero), since the optimization is not possible, the processing is terminated.

In step 113, whether or not the optimization is possible is discriminated on the basis of register definition and reference data in an instruction block at the inlet of the header block and in an instruction block at the exit of the tailer block. If the register defined or referred to in the instruction block at the inlet of the header block is defined or referred to in the instruction block at the exit of the tailer block (namely, the definition/reference dependence exists), since the optimization is not possible, the processing is terminated.

Steps 114 to 119 of FIG. 10 show an actual optimization process.

In step 114, the number "x" of instructions in the instruction block at the inlet of the header block is found, and in the next step 115, there are obtained the number "z" of instructions which are included in the above found instructions of the number "x" in the instruction block at the inlet of the header block and which can be moved to the tailer block without using the execution selection processing, and the number "m" of empty instruction fields which can be moved. An instruction in which a register to be defined is not included in the live variables at the exit of the header block is a movable instruction. In addition, a movable empty instruction field is an empty instruction field included in an instruction block (called Q) itself in which a register defined by a movable instruction is referred to or in any one of all instruction blocks after the instruction block Q or in an instruction block (called P) itself in which a register referred to by the movable instruction is referred to or in any one of all instruction blocks after the instruction block P.

In step 116, whether or not the optimization is possible is discriminated on the basis of the number "x" in the step 114, the number "y" in the step 111 and the number "z" in step 115. If $(x-z)>y$, since the optimization is not possible, the processing is terminated.

In the succeeding steps 117 to 119, "move" and "copy" of codes and reconstruction of the loop are performed. In step 117, the instructions of the number "z" (found in the step 114) in the instruction block at the inlet of the header block are moved to the empty fields of the number "m" at the tailer block. The instructions (in the instruction block at the inlet of the header block) which are not included in the instructions of the number "z" are moved to the empty fields at the exit of the tailer block by adding the execution selection processing "+".

In step 118, a new basic block is generated, and the instruction of the instruction block at the inlet of the head block which has been moved in step 117 is copied.

Finally, in the step 119, the reconstruction of the loop is performed. Specifically, a first or heading instruction block included in the header block is deleted. With this, the length of the loop (the number of instruction blocks forming the loop) is shortened by one instruction block.

In addition, the following modification of the flow information and the branch destination is carried out.

(a) The "former" for the header block is constituted by the tailer block and the new basic block generated in the step 118.

(b) The "latter" for the basic block (other than the tailer block) that handles the header block as being the "latter" is changed from the header block to the new basic block generated in the step 118.

(c) If the branch destination of the basic block for which the "latter" has been changed in the step (b) is the header block, the branch destination is changed to the new basic block generated in the step 118.

(d) The "former" for the new basic block generated in the step 118 is formed by all of the basic blocks for which the latter has been changed in the step (b).

(e) The "latter" for the new basic block generated in the step 118 is formed by the header block.

Figure 11:
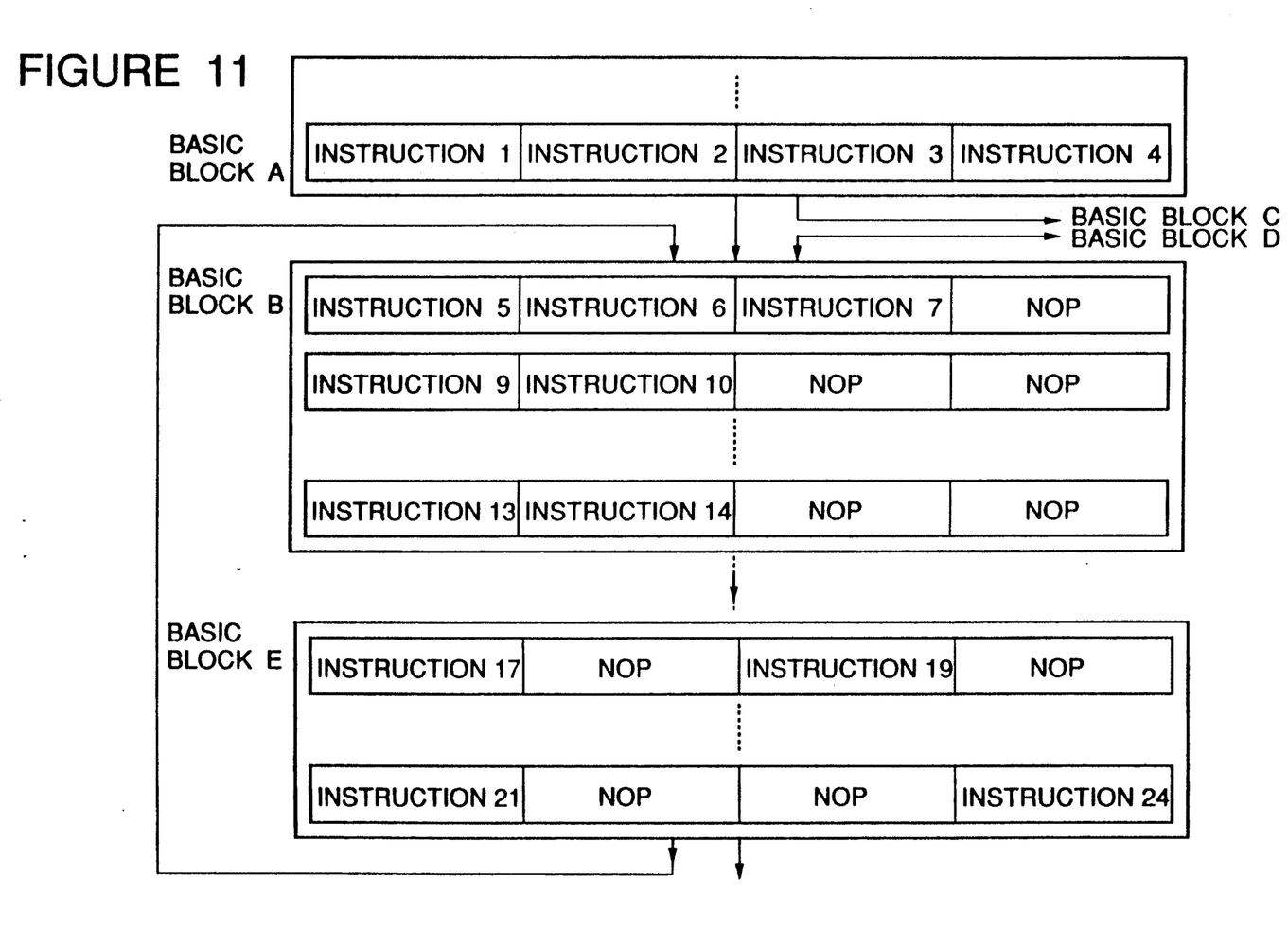
Figure 12:
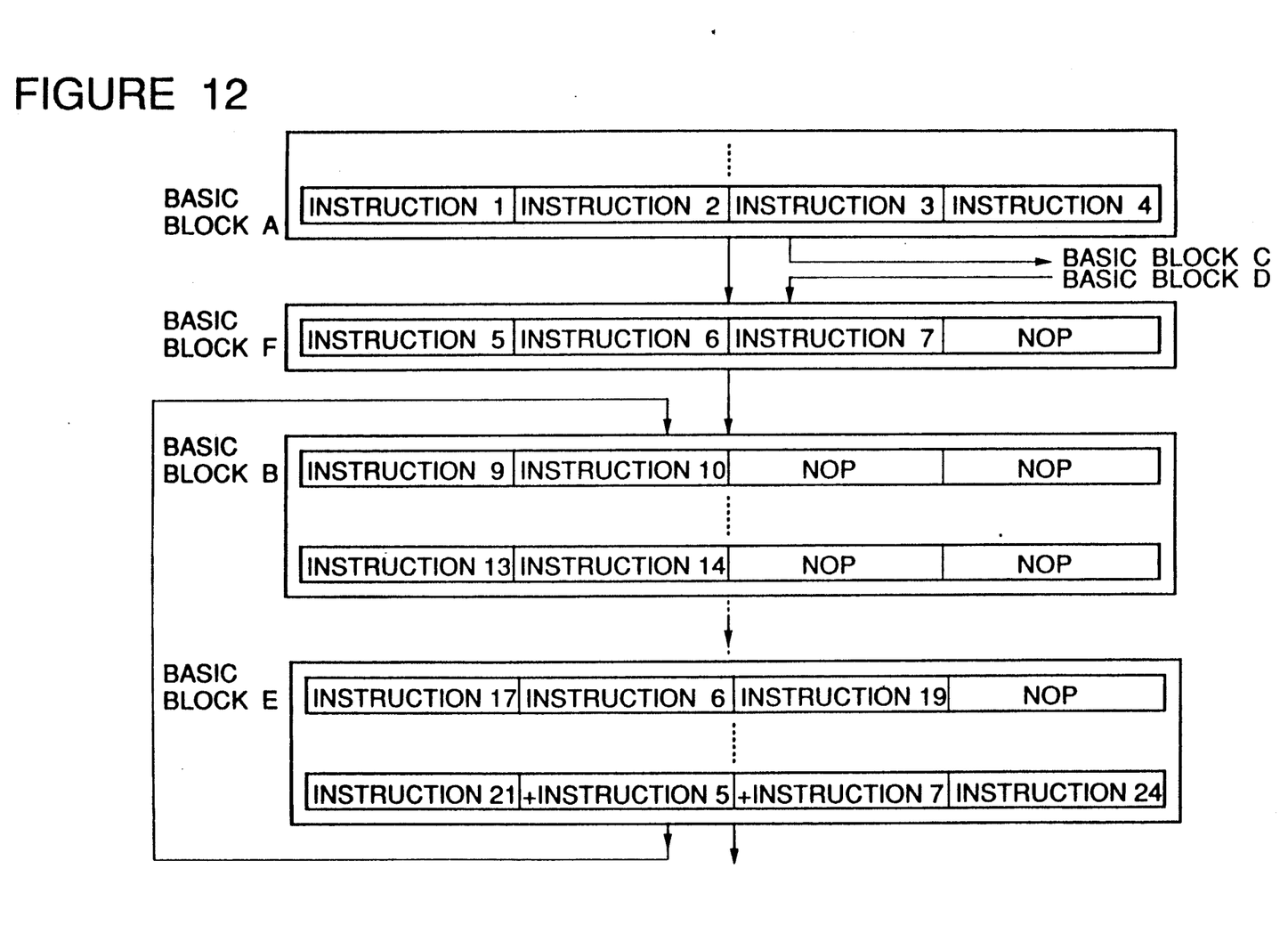

If the program sequence shown in FIG. 11 is optimized, the program sequence shown in FIG. 12 can be obtained. Assume that a natural loop having a reverse direction flow "E→b" can be optimized. In an instruction block at the inlet of the header block B and including instructions 5 to 7, the instruction 6 which is counted as one of the number "z" of instructions in the step 117 is moved to a tailer block E, and the remaining instructions (the instructions 5 and 7) are moved to an instruction block at the exit of the tailer block E by adding the execution selection processing "+". Then, a basic block F consisting of only one instruction block composed of the instructions 5 to 7 is generated in the step 118. In the final step 119, the loop is reconstructed. The flow shown in FIG. 12 can be obtained by deleting the heading instruction block (composed of the instructions 5 to 7 and a NOP instruction) in the header block B.

Thus, since the heading instruction block (composed of the instructions 5 to 7 and a NOP instruction) in the header block B is deleted from the loop, the loop is shortened by one instruction block. Therefore, a repeated instruction processing time of a loop consisting of the basic blocks B to F can be shortened.

The invention has thus been shown and described with reference to the specific embodiments. However, it should be noted that the present invention is in no way limited to the details of the illustrated structures but changes and modifications may be made within the scope of the appended claims.

We claim:

1. A parallel pipelined instruction processing system for executing a plurality of instructions in parallel without any branch delay, comprising:

an instruction block memory storing very long instruction words in memory blocks, said memory blocks including a plurality of instruction fields and a branch instruction field, said instruction block memory including an address bus;

an instruction block fetching unit coupled to said instruction block memory to fetch a memory block designated by an address on said address bus of said instruction block memory;

a data register block having a plurality of write ports and a plurality of read ports, said data register block storing operands;

a plurality of first execution units connected to receive an instruction from a corresponding instruction field of a memory block fetched by said instruction block fetching unit, each of said first execution units including instruction decode and operand fetch means for decoding a transferred instruction and connected to corresponding read ports of said data register block for fetching an operand from said data register block to be used in the transferred instruction, an instruction execution unit connected to said operand fetch and decode means for executing the transferred instruction, and an operand write unit connected to sid instruction execution unit and to a corresponding write port of said data register group for writing a result of an execution of the instruction to the data register group; and a branch instruction unit connected to receive a branch instruction field from a memory block fetched by said instruction block fetching unit, said branch instruction unit including branch instruction decode and operand fetch means for decoding a transferred branch instruction and connected to corresponding read ports of said data register block for fetching an operand from said data register block to be used in said transferred branch instruction, an address generation circuit connected to said instruction block fetching unit to receive said transferred branch instruction and connected to said branch instruction decode and operand fetch means for generating a branch destination address and for simultaneously generating a next address of an instruction to be fetched, and a branch operand write unit connected to receive a next address generated by said address generation circuit and connected to a corresponding write port of said data register block, said branch instruction unit outputting said branch destination address to said instruction block memory or said next address to said data register block on the basis of a content of said branch instruction decode and operand fetch means;

said address generation circuit examining an operand fetched by said branch instruction decode and operand fetch means to determine a satisfaction/failure of a conditional branch condition and, if said branch condition is satisfied, outputting a branch destination address to the address bus, but is said branch condition is not satisfied, outputting a next address to the address bus, said address generation circuit further outputting a branch destination address to the address bus and causing said branch operand write circuit to write the next address to said data register block for a branch-and-link instruction.

2. The parallel pipelined instruction processing system recited in claim 1 wherein at least one of said instruction execution units is further connected to said instruction block fetch unit to receive an execution plus/minus signal and connected to said address generation circuit to receive a branch condition satisfaction signal, said at least one instruction execution unit being responsive to said execution plus/minus signal such that, when said execution plus/minus signal is plus, an action is executed only if the branch condition satisfaction signal is active but, when said execution plus/minus signal is minus, an action is executed only if said branch condition satisfaction signal is inactive and, when said execution plus/minus signal is neither plus or minus, an action is executed no matter whether said branch condition satisfaction signal is active or inactive.

3. The parallel pipelined instruction processing system recited in claim 2 wherein said instruction block memory stores a plurality of very long instruction words in a sequence of instruction blocks which comprise a loop having a header memory block and a tailer memory block, an instruction field in the header memory block is copied to an empty instruction field of said tailer memory block with a code which generates and active plus/minus signal so that a number of instruction blocks included in the loop is decreased.

* * * * *